(12) United States Patent
Khurana et al.

(10) Patent No.: US 11,379,414 B2
(45) Date of Patent: Jul. 5, 2022

(54) GENERATION OF DATA CONFIGURATIONS FOR A MULTIPLE APPLICATION SERVICE AND MULTIPLE STORAGE SERVICE ENVIRONMENT

(71) Applicant: OKERA, INC., San Francisco, CA (US)

(72) Inventors: Amandeep Khurana, San Francisco, CA (US); Nong Li, San Francisco, CA (US)

(73) Assignee: Okera, Inc., San Francisco, CA (US)

( * ) Notice: Subject to any disclaimer, the term of this patent is extended or adjusted under 35 U.S.C. 154(b) by 773 days.

(21) Appl. No.: 15/692,861

(22) Filed: Aug. 31, 2017

(65) Prior Publication Data

US 2019/0018856 A1 Jan. 17, 2019

Related U.S. Application Data

(60) Provisional application No. 62/531,137, filed on Jul. 11, 2017.

(51) Int. Cl.
*G06F 16/30* (2019.01)
*G06F 16/14* (2019.01)
*G06F 8/60* (2018.01)
*G06F 9/445* (2018.01)
*G06F 16/2457* (2019.01)

(52) U.S. Cl.
CPC ............. *G06F 16/144* (2019.01); *G06F 8/60* (2013.01); *G06F 9/44505* (2013.01); *G06F 16/2457* (2019.01)

(58) Field of Classification Search
CPC ...... G06F 16/144; G06F 8/60; G06F 16/2457; G06F 9/44505
USPC ........................................................ 707/769
See application file for complete search history.

(56) References Cited

U.S. PATENT DOCUMENTS

| 6,820,082 B1 * | 11/2004 | Cook .................. G06F 21/6227 707/999.009 |
| 10,303,892 B1 * | 5/2019 | Lim ...................... H04L 63/102 |
| 2003/0093409 A1 * | 5/2003 | Weil .................... G06F 16/9535 |
| 2004/0002880 A1 * | 1/2004 | Jones ................... G06Q 10/063 705/7.37 |
| 2006/0277220 A1 * | 12/2006 | Patrick ................ G06F 21/6218 |
| 2007/0079357 A1 * | 4/2007 | Grinstein .............. G06F 21/629 726/2 |
| 2007/0143379 A1 * | 6/2007 | i Dalfo ..................... G06F 8/61 |
| 2008/0052370 A1 * | 2/2008 | Snyder .................... H04L 67/06 709/217 |
| 2009/0164267 A1 * | 6/2009 | Banatwala ............. G06Q 10/08 707/736 |
| 2011/0265177 A1 * | 10/2011 | Sokolan ................ G06F 16/248 726/19 |

(Continued)

*Primary Examiner* — Mahesh H Dwivedi

(57) ABSTRACT

Disclosed herein provides enhancements for operating a data access system for large data processing environments. In one implementation, a method provides for receiving a data query from at least one of the multiple application services and identifying metadata that defines policies for deploying the queried data. The method further provides retrieving the queried data from at least one of the multiple storage services, generating a data configuration containing the retrieved data based on standardized parameters and the policies defined by the metadata, and deploying the data configuration to the at least one of the multiple application services.

20 Claims, 6 Drawing Sheets

(56) References Cited

U.S. PATENT DOCUMENTS

| | | | |
|---|---|---|---|
| 2012/0010995 A1* | 1/2012 | Skirpa | G06F 16/9577 |
| | | | 705/14.49 |
| 2012/0059839 A1* | 3/2012 | Andrade | G06F 16/252 |
| | | | 707/760 |
| 2012/0084412 A1* | 4/2012 | Burns | H04L 41/0893 |
| | | | 709/221 |
| 2012/0144382 A1* | 6/2012 | Matthew | G06F 8/60 |
| | | | 717/173 |
| 2014/0280683 A1* | 9/2014 | Yanagihara | H04W 4/08 |
| | | | 709/213 |
| 2015/0012630 A1 | 1/2015 | Abuelsaad et al. | |
| 2015/0193500 A1* | 7/2015 | Aute | G06F 16/24542 |
| | | | 707/714 |
| 2015/0277883 A1 | 10/2015 | Giammaria et al. | |
| 2016/0277376 A1* | 9/2016 | Balasubramanian | G06F 21/6209 |
| 2017/0059330 A1* | 3/2017 | Pfeifle | G01C 21/20 |
| 2017/0091107 A1* | 3/2017 | Peterson | G06F 12/123 |
| 2018/0247072 A1* | 8/2018 | Hind | H04L 63/101 |
| 2018/0373757 A1* | 12/2018 | Schukovets | G06F 16/221 |

* cited by examiner

US 11,379,414 B2

GENERATION OF DATA CONFIGURATIONS FOR A MULTIPLE APPLICATION SERVICE AND MULTIPLE STORAGE SERVICE ENVIRONMENT

CROSS-REFERENCE TO RELATED APPLICATIONS

This application is related to and claims priority to U.S. Provisional Patent Application No. 62/531,137, entitled "Generation of Data Configurations for Multiple Application Service and Multiple Storage Service Environment", filed on Jul. 11, 2017, which is incorporated by reference herein in its entirety.

TECHNICAL BACKGROUND

An increasing number of data-intensive applications are being developed to serve various needs, such as processing very large data sets. Multiple storage services employed on clusters of computers are used to distribute various data. In addition to the multiple storage services, various large-scale processing applications have been developed to interact with the large-scale data sets and perform data management tasks, such as organizing and accessing the data and performing related operations with respect to the data.

To deploy the large-scale processing of data from multiple storage services in a computing environment, users are often required to individually configure the programs to operate on a specific application service. These individually configured programs operating on each of the application services are typically not operable on a different application service or must be manually rebuilt by an administrator to adapt to the new application service environment. This rebuilding of each of the application services can be time consuming and cumbersome as each application service may have different deployment parameters.

Additionally, each application service and storage service may require a determination of different data access and deployment requirements, such as determining authorization, performance, and caching parameters. Therefore, current techniques for enabling a user to operate the diverse application services available when accessing large-scale data sets from a variety of storage services are neither efficient nor effective.

OVERVIEW

The technology disclosed herein provides enhancements for operating a data access system for large data processing environments. In one implementation, a method provides for receiving a data query from at least one of the multiple application services and identifying metadata that defines policies for processing the queried data. The method further provides retrieving the queried data from at least one of the multiple storage services and generating a data configuration containing the retrieved data based on standardized parameters and the policies defined by the metadata and deploying the data configuration to the at least one of the multiple application services.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
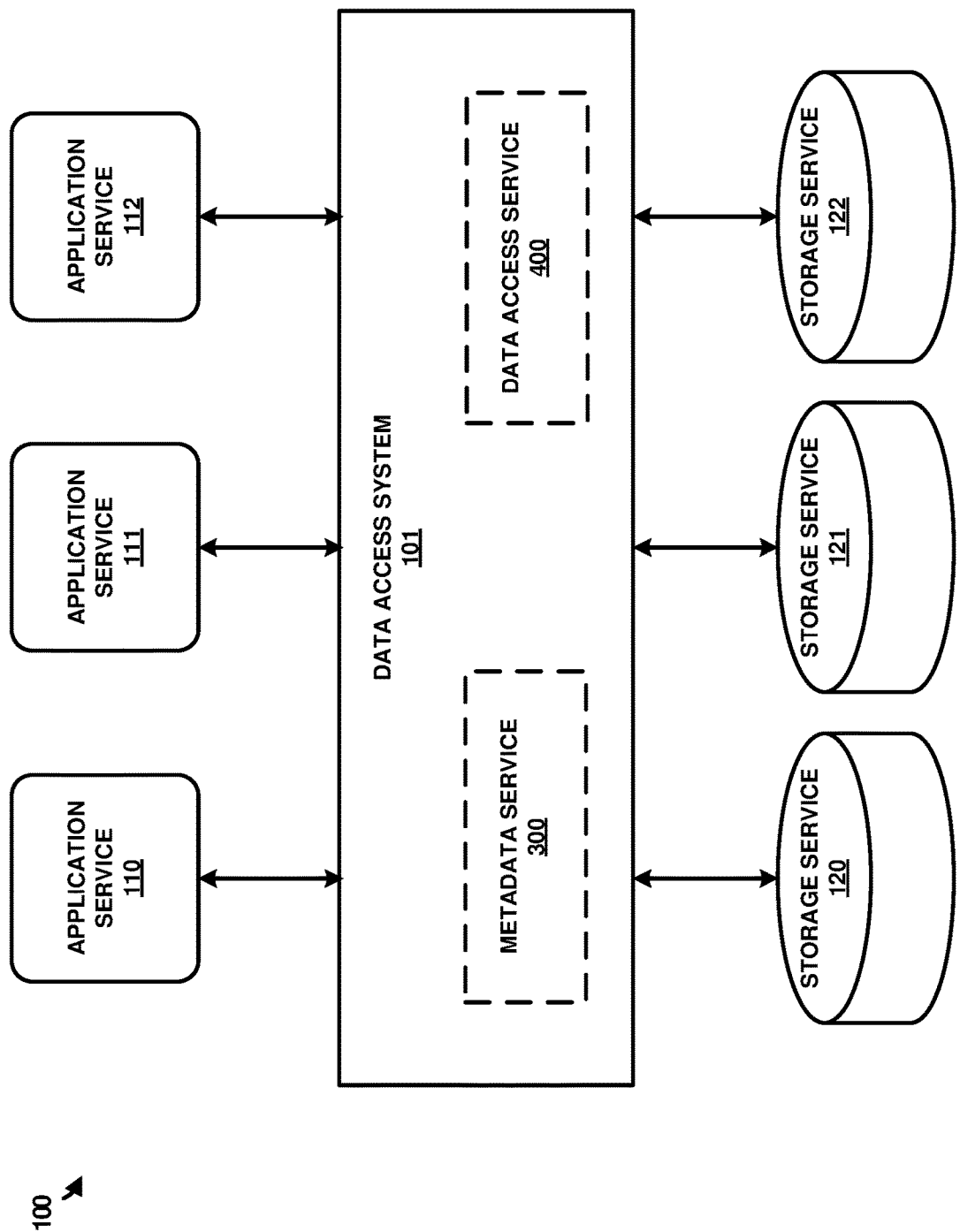
FIG. 1 illustrates a data access system for generating a data configuration in a multiple application service and multiple storage service environment according to one implementation.

Large data processing environments may employ a plurality of data access systems to provide efficient handling of data exchange between multiple application services and multiple storage services. Application services may include a variety of interactive computer applications for organization, analysis, and storages of data. These application services may include a distributed application, an Open Database Connectivity (ODBC) service, a Representational State Transfer (REST) service, or other similar types of application services capable of organizing and deploying data. For example, application services may include a spreadsheet service, a Spark service, a Python service, an electronic medical record service, and the like. In addition to the application services, various storages services are made available that may store digital data on computer components, such as memory. Storage services may comprise a file system, a Relational Database Management System (RDBMS), or a data stream. For example, storage services may be a Hadoop Distributed File System (HDFS), a Simple Storage Service (S3), Kafka, Kinesis, DynamoDB, HBase, versions of the Google file system, or some other custom data store—including combinations thereof. The data may be stored and retrieved on the same physical computing systems or on separate physical computing systems and devices. Data storage and data sources may also be stored using object storage systems.

To retrieve data, application services may desire to query a variety of storage systems, such as by creating a workload job process. These workload job processes may include Hadoop processes, Spark processes, or other similar large data job processes to the host computing systems storing the data to be queried. In some implementations, the large data in the storage service may by stored on private serving computing systems, operating for a particular organization.

However, in other implementations, in addition to or in place of the private serving computing systems, an organization may employ a cloud environment, such as Amazon Elastic Compute Cloud (Amazon EC2), Microsoft Azure, Rackspace cloud services, or some other cloud environment, which can provide on demand virtual computing resources to the organization. Within each of the virtual computing resources, or virtual machines, provided by the cloud environments, one or more virtual nodes may be instantiated that provide a platform for the large-scale data processing.

In the present implementation, to efficiently deploy the data from the storage services to the application services within the network, data access systems are created that include the runtime operations required for retrieving and processing the data within the environment. In particular, these data access systems may be responsible for providing an interface for gathering data from a specified storage system, displaying the data, enforcing security and authorization policies, or any other similar procedure for the data retrieval and display service. Further, in some examples, the data access systems may be responsible for organizing and managing the data based on their source storage service and destination application service within the processing environment.

To generate the policies for processing the data, one or more metadata files may be used that describe runtime requirements for retrieving and deploying the data to an application service. This metadata may include IP addressing requirements for the data, such as the IP addresses that will be allocated to the data, memory requirements for the data, such as the amount and/or location of the memory addresses that will be allocated to the data, the processing requirements, such as the number of cores that will be allocated to the data, or any other similar processing or addressing information requirement for the data. Based on the information in the one or more metadata files, a data configuration may be generated and deployed within a computing environment.

FIG. 1 illustrates a computing environment 100 to operate a data access system according to one implementation. Computing environment 100 includes data access system 101, application services 110-112, and storage services 120-122. Data access system 101 is an example of a data access system described herein, and includes metadata service 300 and data access service 400 that may execute on one or more physical computing systems. This computing system may include desktop computing systems, server computing systems, or any other similar physical computing system capable of providing a platform for data access system 101.

In operation, data access system 101 may receive a data query from at least one of the multiple application services 110-112, such as application services 110-111. Once the data query has been received, data access system 101 may identify metadata that defines policies for processing the queried data. The policies indicate requirements that need to be identified before the data query can be administered within an environment. For example, metadata service 300 may require that the IP address associated with the data query be authorized to access data from each of storage services 120-122. Once data access system 101 identifies the policies for processing the queried data, data access system 101 retrieves the queried data from at least one of the multiple storage services 120-122. After retrieving the queried data, data access system 101 generates a data configuration containing the retrieved data based on standardized parameters and the policies defined by the metadata. After being generated, data access system 101 may deploy the data configuration to one or more application services 110-111.

Figure 2:
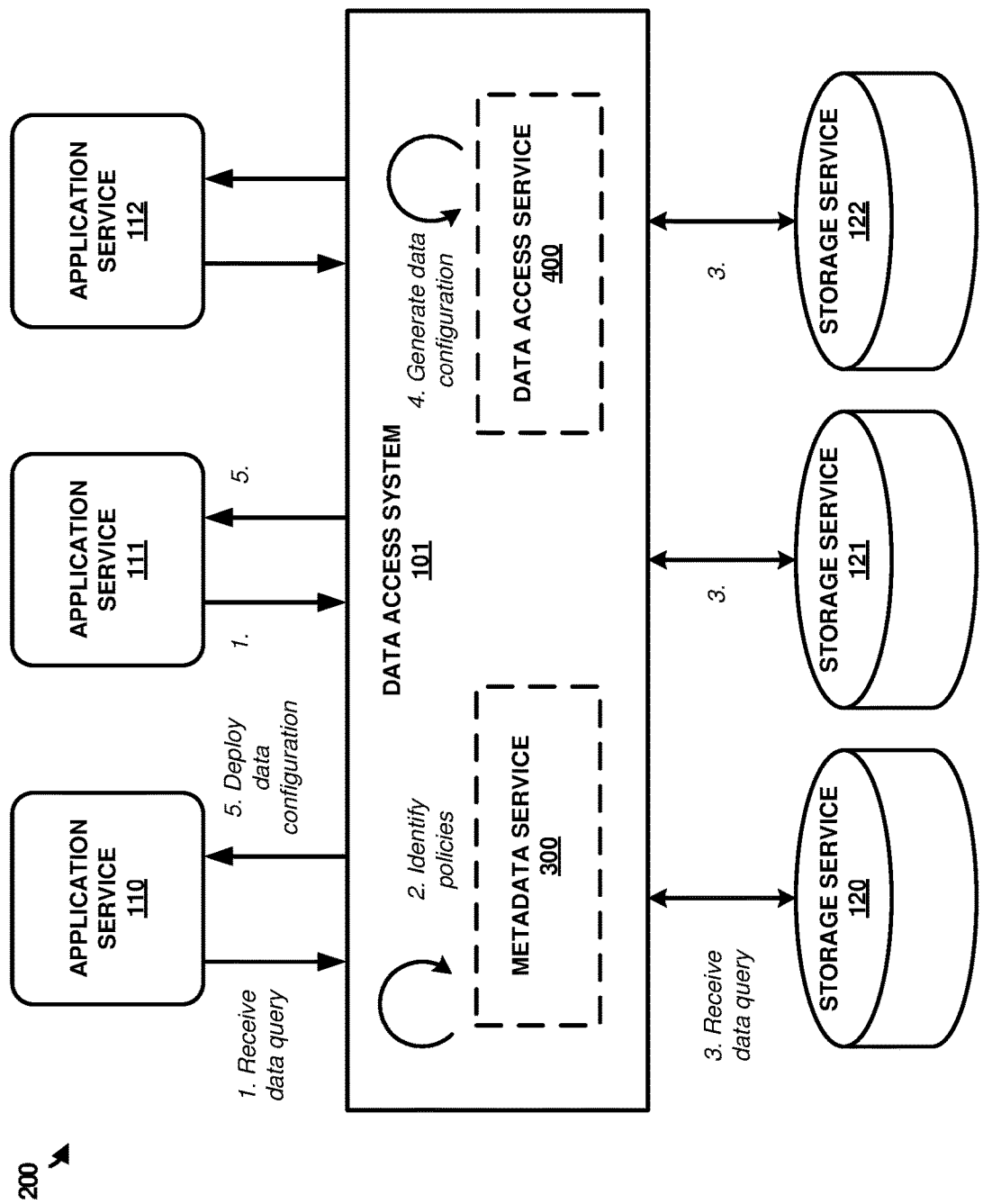
FIG. 2 illustrates an operational scenario of a data access system for generating a data configuration in a multiple application service and multiple storage service environments.

Referring now to FIG. 2, FIG. 2 illustrates an operational scenario 200 of operating a data access system. Operational scenario 200 includes systems and elements from computing environment 100 of FIG. 1.

As depicted, at step 1, data access system 101 receives a data query from at least one of the multiple application services 110-112, such as application services 110-111. Application services 110-111 may comprise a distributed application, an ODBC service, an REST service, or some other similar application service that may query various storage systems for data. For example, application services 110-111 may comprises a spreadsheet service, a Spark service, a Python service, an electronic medical record service, and the like. In addition to receiving the data query, data access system 101, at step 2, identifies metadata that defines policies for processing the queried data. The policies may indicate requirements that need to be identified before the data query can be administered within an environment. In some implementations, in identifying the metadata that defines the policies, metadata service 300 may generate one or more metadata files, wherein the files define characteristics that must be identified for processing the queried data in the request before the data query may be administered. The characteristics include security and authorization characteristics, caching characteristics, performance management characteristics, among other characteristics, including various combinations thereof.

Once the data query has been received and the policies indicated in the metadata have been identified, data access system 101 may retrieve, at step 3, the queried data from at least one of multiple storage services 120-122. Storage services 120-122 may comprise a file system, an RDBMS, or a data stream. For example, storage services 120-122 may be a Hadoop Distributed File System (HDFS), a Simple Storage Service (S3), Kafka, Kinesis, DynamoDB, HBase, or some other custom data store. The data may be retrieved based on the policies defined in the metadata. For example, the metadata may define which data application services 110-111 may receive data from storage services 120-122. After the queried data is retrieved, at step 4, a data configuration is generated containing the retrieved data based on standardized parameters and the policies defined by the metadata. Once the data configuration is generated, at step 5, access data system 101 deploys the data configuration to application services 110-111.

In at least one implementation, to generate the data configuration, data access system 101 generates a virtual table service containing the queried data. The virtual table service is generated based on the standard parameters and the policies identified by the metadata. The virtual table service is then deployed to application services 110-111. The virtual table service may include standard parameters that are directly inputted by the user when requesting the data, application services 110-112, storage services 120-122, and may further include parameters automatically determined by data access system 101. For example, if the user defined that the queried data should be deployed in a pre-determined format, data access system 101 may generate the virtual table service to accommodate the pre-determined format for all of the retrieved data, regardless of which storage service 120-122 the data was retrieved from and which application service 110-112 the data is deployed to. Thus, rather than requiring a separate virtual table service to be generated for each of the various application services 110-112 using data retrieved by each of the various storage services 120-122, the virtual table service may be generated using standard parameters regardless of where the data is retrieved from and where the data is being deployed.

Figure 3:
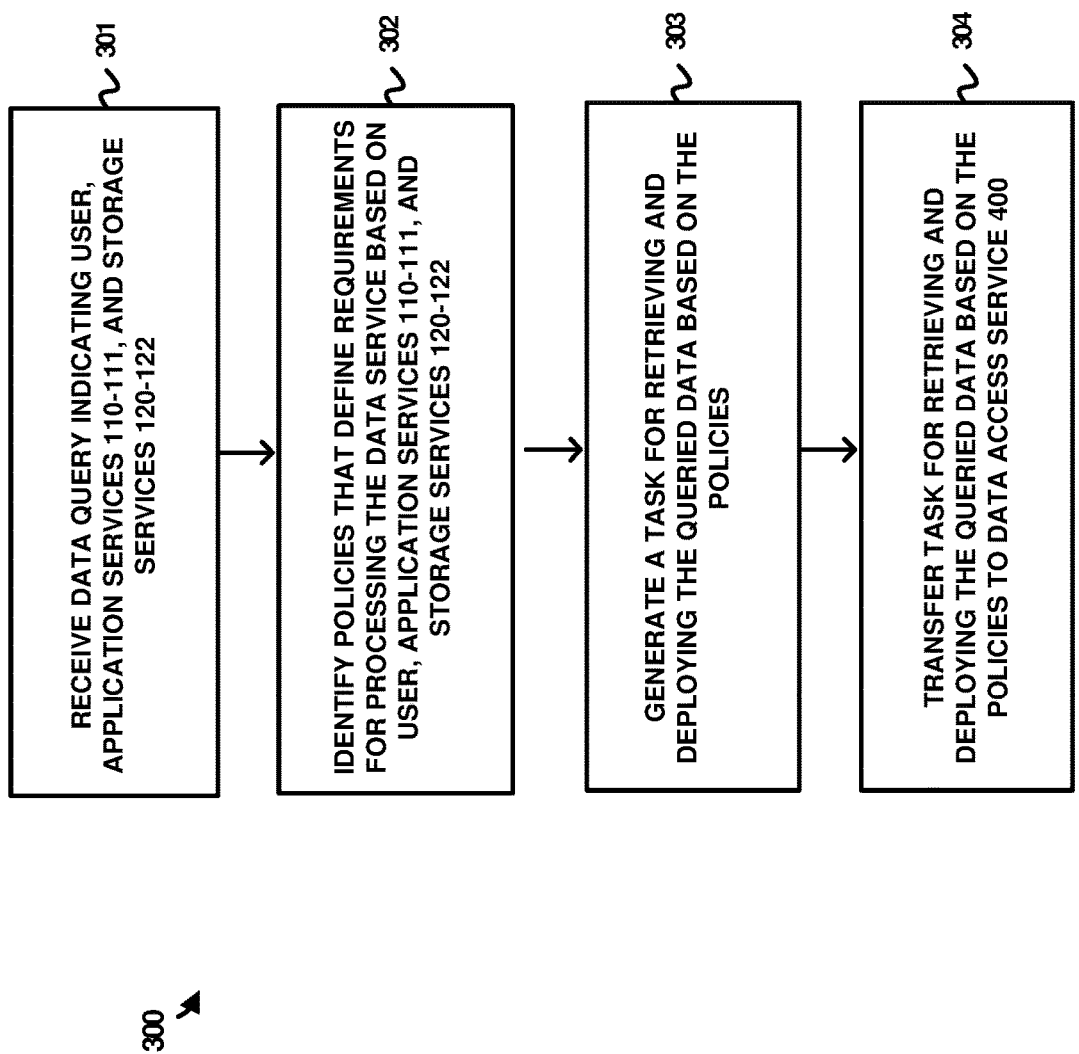
FIG. 3 illustrates a method of operating a metadata service for generating a data configuration in a multiple application service and multiple storage service environment according to one implementation.

To further demonstrate the operations of computing environment 100, FIG. 3 is provided. FIG. 3 illustrates a method of operating metadata service 300 in a multiple application service and multiple storage service environment according to one implementation. The operations of FIG. 3 are described in the paragraphs that follow with reference to systems and objects of computing environment 100 from FIG. 1.

As illustrated in FIG. 3, the method begins with metadata service 300 receiving (301) a data query indicating a user, application services 110-111, and storage services 120-122. Once the data query has been received, metadata service 300 identifies (302) policies that define requirements for processing the data service based on the user, application services 110-111, and storage services 120-122. The method further includes metadata service 300 generating (303) a task for retrieving and deploying the queried data based on the polices. In a final step, metadata service 300 transfers (304) the task for retrieving and deploying the queried data based on the policies to data access service 400.

Referring to the example of FIG. 1, metadata service 300 is provided in data access system 101, along with data access service 400. The metadata includes policies to be identified for processing the queried data before the queried data can be received from storage systems 120-122 and before the data configuration can be generated and deployed. These policies may include, but are not limited to, performance management restrictions that will be provided to the data configuration containing the queried data when it is generated and deployed within data access system 101. The policies may further include, security and authorization restrictions that will be provided to the enforce user authorization and authentication when accessing the queried data from storage services 120-122. For example, metadata service 300 may provide metadata that indicates the IP address of a user and whether the IP address is authorized to access the queried data from each of storage systems 120-122. In other examples, the policies indicated in the metadata may specify caching restrictions. For example, the policies may indicate restrictions on where each memory item can be placed in a subset of cache locations that are allocated to the data configuration when it is deployed to application services 110-111.

Once the queried data is received and the metadata identified, metadata 300 may generate tasks for retrieving and deploying the queried data based on the polices. The tasks may modify the request to indicate the policies and transfer the modified request to the data access service 400. In particular, these tasks may provide operations to determine the IP addresses applicable to the queried data, the caching resources applicable to the queried data, the performance measurements applicable to the queried data, or any other similar requirements for the queried data.

In some implementations, metadata service 300 identifies one or more metadata files in an API format and generates the tasks by including the metadata files in the API format. Metadata service 300 may further translate the one or more metadata files in the API format into the data configuration containing the retrieved data. For example, the user of application services 110-111 may desire to retrieve medical records for a particular patient from storage services 120-122. Metadata service 300 may identify the authorization of the user for the medical records on each of storage services 120-122 based on the user IP address in conjunction with application services 110-111 performance restrictions. Accordingly, metadata service 300 determines the metadata files in an API format indicating the associated policies and generates a task to retrieve the data which includes the metadata files. Metadata service 300 may then translate the metadata files into the API format. However, in some examples, metadata service 300 may retrieve the metadata files in the API format without the need for translation. Once the task is generated, metadata service 300 transfers the task to data access service 400. Consequently, the task indicates a modified request comprising policies for data retrieval that meet the authorization and performance management restrictions for the medical record requested by the user.

Figure 4:
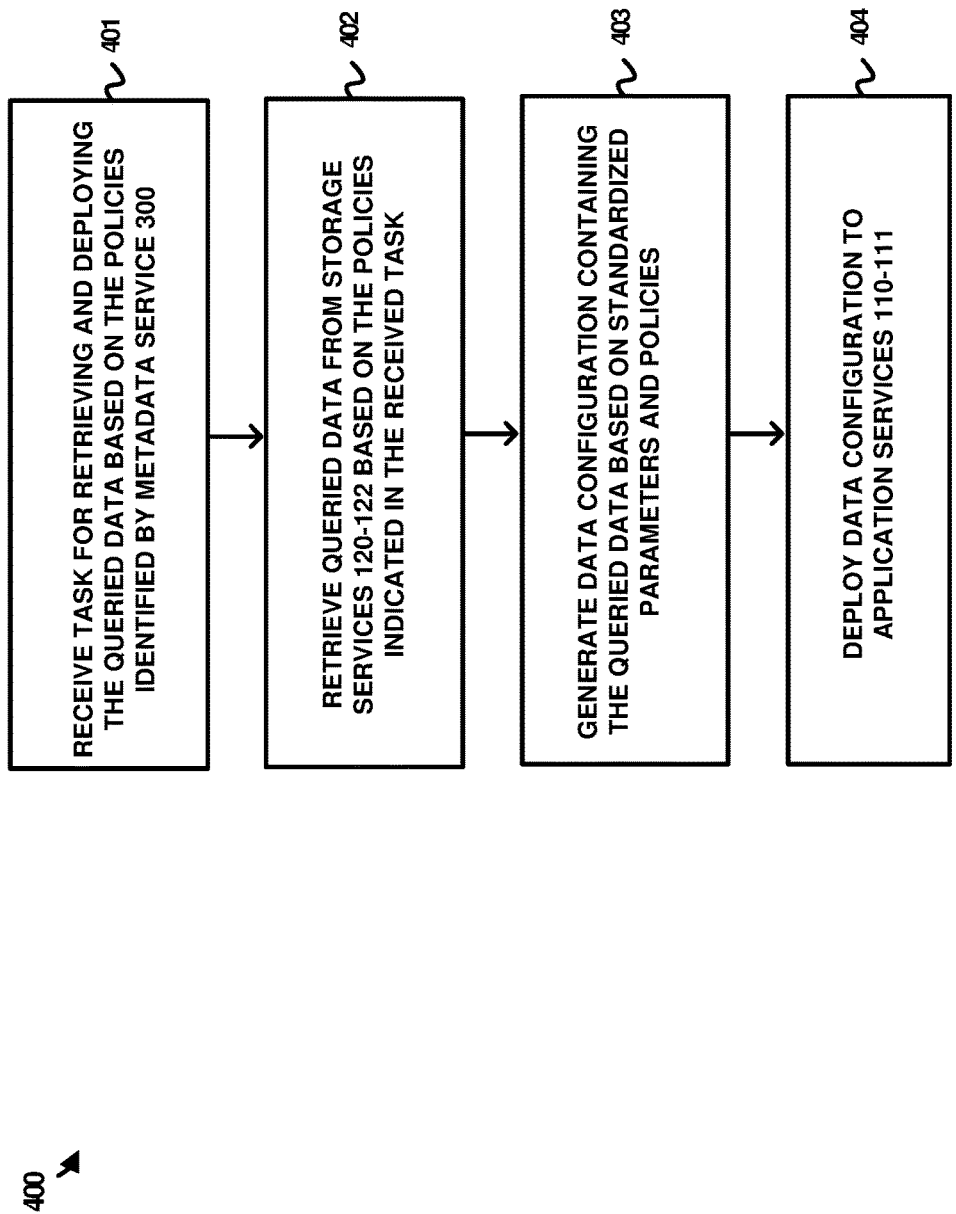
FIG. 4 illustrates a method of operating a data access service for generating a data configuration in a multiple application service and multiple storage service environment according to one implementation.

Continuing the demonstration of the operations of computing environment 100, FIG. 4 is provided. FIG. 4 illustrates a method of operating data access service 400 in a multiple application service and multiple storage service environment according to one implementation. The operations of FIG. 4 are described in the paragraphs that follow with reference to systems and objects of computing environment 100 from FIG. 1.

As illustrated in FIG. 4, the method begins with data access service 400 receiving (401) the task for retrieving and deploying the queried data based on the policies identified by metadata service 300. Once the task has been received, data access service 400 retrieves (402) the queried data from storage services 120-122 based on the policies indicated by the received task. The method further includes data access service 400 generating (403) a data configuration containing the queried data based on standardized parameters and the policies. In a final step, data access service 400 deploys (404) the data configuration to application services 110-111.

The standardized parameters include procedures for accessing and organizing data from different platforms through a single system, such as data access system 101. The standardized parameters may include tabular APIs that can be used to access and display data from a variety of different analytic engines containing a variety of different data types and workloads. These standardized parameters may include, but are not limited to, transforming the queried data received from each of the storage services 120-122 to provide tables, graphs, and views of data in a uniform platform that may be viewed consistently by any of application services 110-111 requesting the queried data. For example, the queried data may be accessed and deployed in a table as a service. The table as a service may enable users to interact with a variety of data types and workloads consistently in both application service 110 and application service 111.

Although illustrated in the examples of FIGS. 1-4 with an internal metadata service, such as metadata service 300, directly providing the policies for processing the queried data in data access system 101, it should be understood that the policies may be identified by an external metadata service using a computing system or device that does not directly identify the policies within data access system 101. For example, an external metadata service may generate metadata files in response to a metadata request from data access system 101 for the queried data such as a metadata service that uploads the policies contained in metadata files to an online database. From the database, data access system 101 may be capable of selecting (and downloading) the policies in the metadata files to be applied when processing the queried data. Consequently, a centralized database of metadata containing various policies may be created that can be accessed or provided to data access system 101 which may contain policy information for a variety of application services and storage services.

Figure 5:
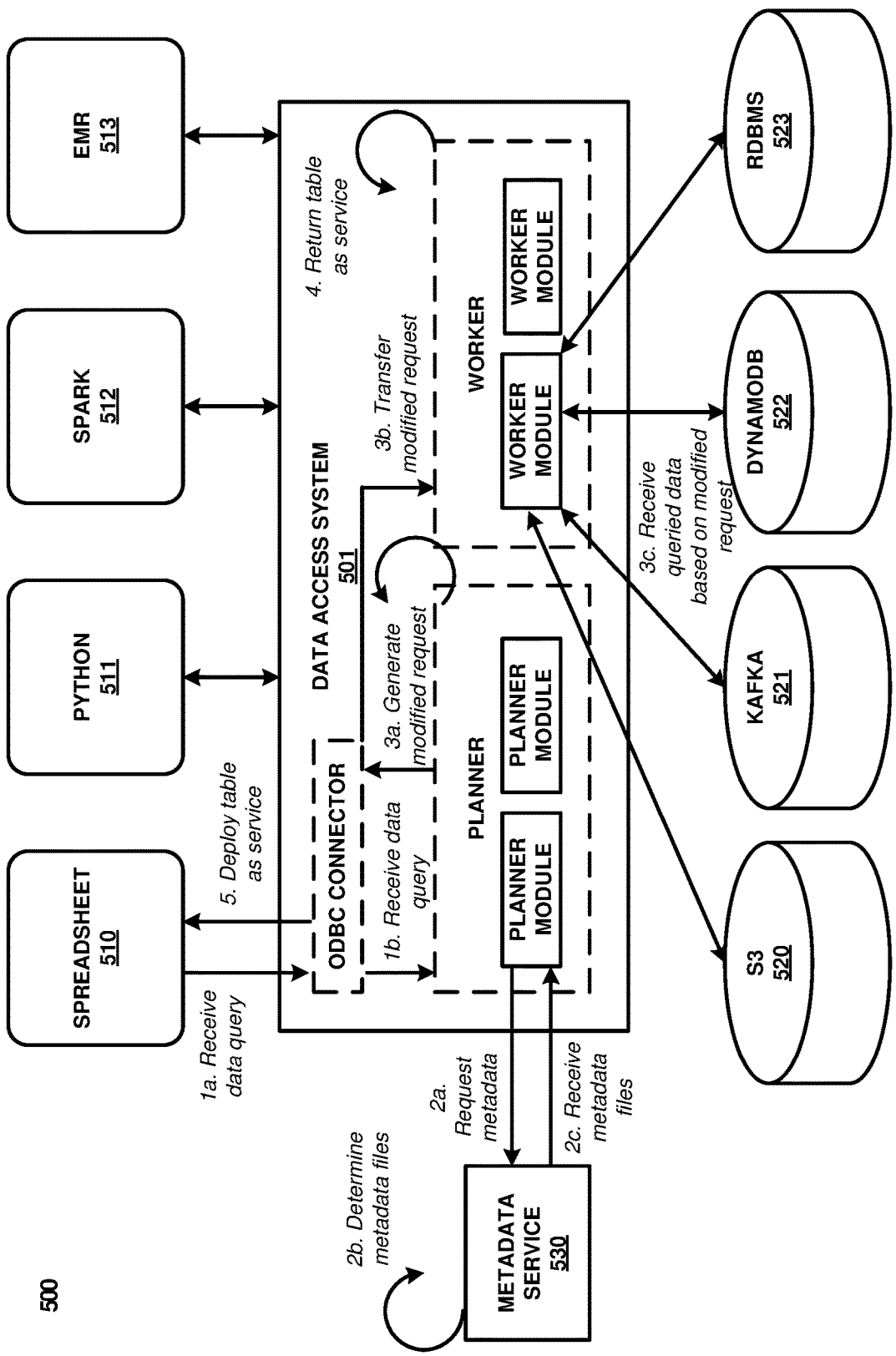
FIG. 5 illustrates an overview of generating a data table as a service in a multiple application service and multiple storage service according to one implementation.

FIG. 5 illustrates an overview 500 of generating a virtual table service according to one implementation. Overview 500 includes data access system 501, application services 510-513, storage services 520-523, and metadata service 530. Application services 510-513 include spreadsheet application 510, Python 511, Spark 512, and electronic medical record application 513. Storage services 520-523 include S3 520, Kafka 521, DynamoDB 522, and RDBMS 523. Data access system 501 includes communication interfaces, such as an ODBC connector, a planner comprising planner modules, and a worker comprising worker modules. As shown in FIG. 5, data access system 501 is capable of receiving data requests from various application services 510-513 and retrieve data from various storage services 520-523.

As described herein, at step 1a, to generate a table as a service within a large data processing environment, a data query is initiated by at least one of the various application services 510-513, such as spreadsheet application 510. For example, a scientist may be performing research on a rare disease. The scientist may desire to gather data from as many data storage environments as possible since current data on the rare disease is sparse. Therefore, the scientist may generate a request in spreadsheet application 510 for the data from any of storage services 520-523. The request is transferred to data access system 501 in the ODBC connector.

Next, at step 1b, the data query is transferred from the ODBC connector to the planner within data access system 501. The planner controls authorization, performance management, and caching restrictions for data queries. For example, the scientist may be authorized to receive the queried data involving symptoms of the disease, age and gender of patients, and medication prescribed and their side effects. However, the scientist may not be authorized to receive data involving personal information about the patients, such as names and residential addresses. Therefore, in response to receiving the data query request from spreadsheet application 510, the planner generates an authorization request in a planner module within the planner.

In step 2a, the planner transfers the authorization request from a planner module to external metadata service 530. Here, metadata service 530 may receive authorization policies from each of application services 510-513 and storage services 520-523. Metadata service 530 may also receive the authorization policies from data access system 501. For example, S3 storage system 520 may upload policies indicating that general medication and side effect information is accessible without restriction but that some current experimental medications and side effect information is restricted to qualified research institutions. Metadata service 530 may then determine metadata files indicating authorization policies for each of storage services 520-523, as indicated in step 2b. Once metadata service 530 determines the metadata files indicating the authorization policies, in step 2c, the metadata files are transferred by to the planner module within the planner of data access system 501.

In step 3a, the planner generates a modified request based on the authorization policies received from metadata service 530. In some examples, the planner generates the modified request by generating a task for delivery to the worker. The task may include translated APIs from the metadata files indicating a modified data query based on the authorization policies. The modified request is then transferred to the ODBC connector in step 3b. In some examples, the modified request may be transferred back to application services 510-513, such as spreadsheet application 510. In this example, spreadsheet application 510 would then transfer the modified request to the worker. Referring again to FIG. 5, the modified request is transferred from the ODBC connector to the worker. In step 3c, the modified request is then transferred to storage service 520-523 and the queried data is received back to the worker module in the worker.

Still referring to FIG. 5, in response to receiving the queried data, in step 4, the worker returns a table as a service containing the queried data based on the authorization policies identified in the metadata files and standardized parameters. These standardized parameters may include the selection of layout to be provided to spreadsheet application 510, a user group to have access to the generated table as a service, data interaction tools, or any other similar preference information related to the generation and deployment of the table as a service. In response to the worker returning the table as a service, the worker transfers the table as a service, at step 5, to be deployed to spreadsheet application 510. For example, the scientist may then view the data in a standardized view regardless of which storage service 520-523 the data was queried from. Advantageously, access data system 501 can be used by any of application services 510-513 without requiring additional programming and configurations by the users.

Figure 6:
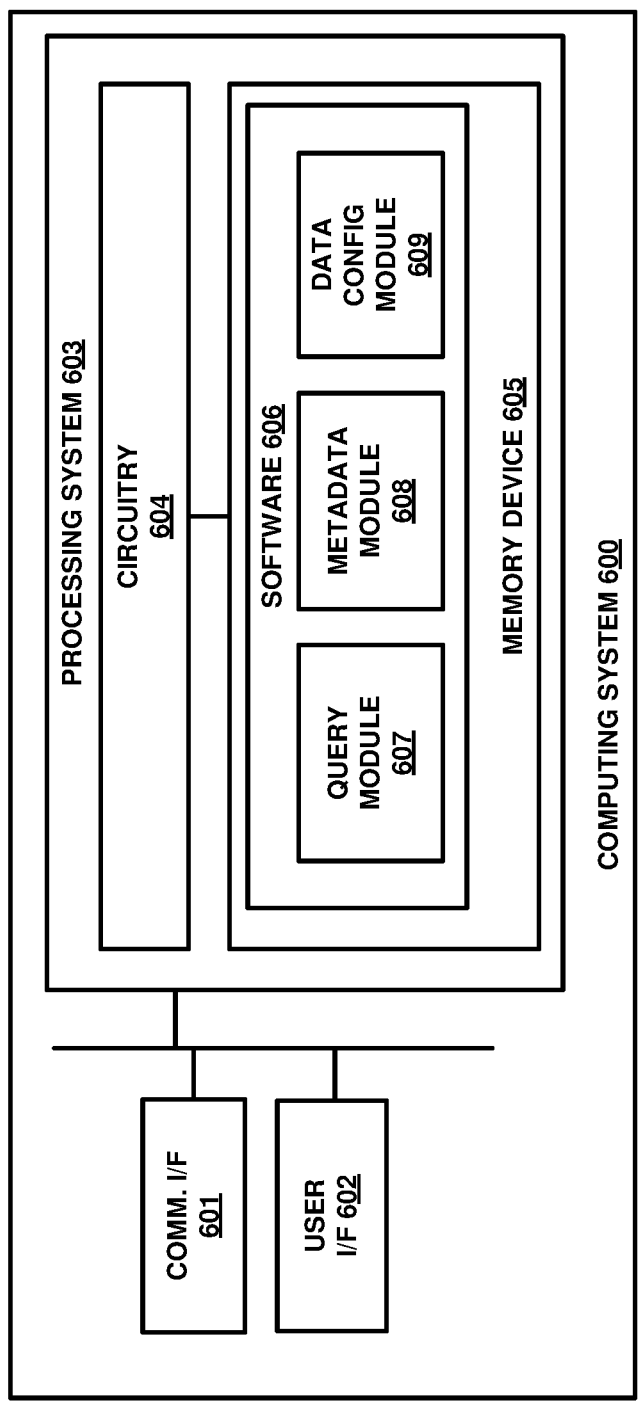
FIG. 6 illustrates a computing system to generate a data configuration in a multiple application service and multiple storage service according to one implementation.

FIG. 6 illustrates a computing system 600 to generate a data configuration in a multiple application service and storage service environment according to one implementation. Computing system 600 is representative of any computing system or systems with which the various operational architectures, processes, scenarios, and sequences disclosed herein for generating data configurations may be employed. Computing system 600 is an example of data access system 101 from FIG. 1 and data access system 501 from FIG. 5, although other examples may exist. Computing system 600 comprises communication interface 601, user interface 602, and processing system 603. Processing system 603 is linked to communication interface 601 and user interface 602. Processing system 603 includes processing circuitry 604 and memory device 605 that stores operating software 606. Computing system 600 may include other well-known components such as batteries and enclosures that are not shown for clarity. Computing system 600 may comprise one or more servers, personal computers, routers, or some other computing apparatus, including combinations thereof.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 604 comprises microprocessor and other circuitry that retrieves and executes operating software 606 from memory device 605. Memory device 605 may include volatile and nonvolatile, removable and non-removable media implemented in any method or technology for storage of information, such as computer readable instructions, data configurations, program modules, or other data. Memory device 605 may be implemented as a single storage device, but may also be implemented across multiple storage devices or sub-systems. Memory device 605 may comprise additional elements, such as a controller to read operating software 606. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 604 is typically mounted on a circuit board that may also hold memory device 605 and portions of communication interface 601 and user interface 602. Operating software 606 comprises computer programs, firmware, or some other form of machine-readable program instructions. Operating software 606 includes query module 607, metadata 608, and data configuration module 609, although any number of software modules within the application may provide the same operation. Operating software 606 may further include an operating system, utilities, drivers, network interfaces, applications, or some other type of software. When executed by processing circuitry 604, operating software 606 directs processing system 603 to operate computing system 600 as described herein.

In at least one implementation, query module 607, when read and executed by processing system 603, directs processing system 603 to receive a data query from at least one of multiple application services, wherein the multiple application services may comprise a distributed application, an ODBC service, a REST service, and the like. In addition, query module 607 directs processing system 603 to retrieve the queried data from at least one of the multiple storage services. When read and executed by processing system 603, metadata module 608 directs processing system 603 to identify metadata that defines policies for processing the queried data in a large data processing environment. These policies may include performance management restrictions, security and authorization restrictions, caching restrictions, or any other similar policies indicating procedures for processing the queried data.

Once the policies have been identified by the metadata, data configuration module 609 directs processing system 603 to generate a data configuration containing the retrieved data based on standardized parameters and the policies defined by the metadata. In some implementations, the metadata provided may be generated in the form of one or more metadata files in a API format. Based on the metadata in the API format, data configuration module 609 may translate the one or more metadata files in the API format into the data configuration containing the retrieved data. After the data configurations are generated, data configuration module 609 further directs processing system 603 to deploy the data configuration to the at least one of the multiple application services.

In some implementations, computing system 600 may include a planner. In this implementation, metadata module 608 directs processing system 603 to query a metadata service for metadata defining the policies for processing the queried data. In other implementations, computing system 600 may include a worker. In this implementation, query module 607 directs processing system 603 to retrieve the queried data from the at least one of the multiple storage services.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a data access system for data processing environments comprising multiple application services and multiple storage services, the method comprising:
   in a metadata service, receiving a data query from an application service of the multiple application services, wherein the data query comprises a request for data stored in at least one of the multiple storage services;
   in the metadata service, identifying metadata that defines policies for retrieving and deploying the data, wherein the policies defined in the metadata include at least one restriction associated with the data;
   in the metadata service, generating a task for retrieving and deploying the data based on the policies defined in the metadata, wherein the task modifies the request to indicate the policies;
   in the metadata service, transferring the task to a data access service;
   in the data access service, in response to receiving the task from the metadata service, retrieving the data from the at least one of the multiple storage services based on the policies;
   in the data access service, generating a data configuration comprising the retrieved data based on the policies and standardized parameters; and
   in the data access service, deploying the data configuration to the application service.

2. The method of claim 1 wherein the application service of the multiple application services comprises at least one of a distributed application, an Open Database Connectivity (ODBC) service, and a Representational State Transfer (REST) service.

3. The method of claim 1 wherein the at least one of the multiple storage services comprises one or more of a file system, a Relational Database Management System (RDBMS), and a stream.

4. The method of claim 1 further comprising generating a virtual table service, wherein the virtual table service comprises the retrieved data based at least in part on the policies.

5. The method of claim 4 wherein generating the virtual table service comprising the retrieved data comprises translating one or more metadata files in an Application Program Interface (API) format into the virtual table service comprising the retrieved data.

6. The method of claim 1 wherein the at least one restriction comprises a performance management restriction.

7. The method of claim 1 wherein the at least one restriction comprises an authorization restriction.

8. The method of claim 1 wherein the at least one restriction comprises a caching restriction.

9. The method of claim 1 wherein the data access system includes a planner and wherein identifying the metadata that defines the policies for obtaining and deploying the data comprises the planner querying the metadata service for the metadata defining the policies for obtaining and deploying the data.

10. The method of claim 1 wherein the data access system includes a worker and wherein retrieving the data from the at least one of the multiple storage services comprises the worker retrieving the data from the at least one of the multiple storage services.

11. A computing apparatus comprising:
one or more non-transitory computer readable storage media;
a processing system operatively coupled with the one or more non-transitory computer readable storage media; and
program instructions stored on the one or more non-transitory computer readable storage media to operate a data access system for data processing environments comprising multiple application services and multiple storage services that, when read and executed by the processing system, direct the processing system to at least:
in a metadata service, receive a data query from an application service of the multiple application services, wherein the data query comprises a request for data stored in at least one of the multiple storage services;
in the metadata service, identify metadata that defines policies for retrieving and deploying the data, wherein the policies defined in the metadata include at least one restriction associated with the data;
in the metadata service, generating a task for retrieving and deploying the data based on the policies defined in the metadata, wherein the task modifies the request to indicate the policies;
in the metadata service, transferring the task to a data access service;
in the data access service, in response to receiving the task from the metadata service, retrieve the data from the at least one of the multiple storage services based on the policies;
in the data access service, generating a data configuration comprising the retrieved data based on the policies and standardized parameters; and
in the data access service, deploy the data configuration to the application service.

12. The computing apparatus of claim 11 wherein application service of the multiple application services comprises at least one of a distributed application, an Open Database Connectivity (ODBC) service, and a Representational State Transfer (REST) service.

13. The computing apparatus of claim 11 wherein the at least one of the multiple storage services comprises one or more of a file system, a Relational Database Management System (RDBMS), and a stream.

14. The computing apparatus of claim 11 further comprising generating a virtual table service, wherein the virtual table service comprises the retrieved data based at least in part on the policies.

15. The computing apparatus of claim 14 wherein generating the virtual table service comprising the retrieved data comprises translating one or more metadata files in an Application Program Interface (API) format into the virtual table service comprising the retrieved data.

16. The computing apparatus of claim 11 wherein the at least one restriction comprises a performance management restriction.

17. The computing apparatus of claim 11 wherein the at least one restriction comprises an authorization restriction.

18. The computing apparatus of claim 11 wherein the at least one restriction comprises a caching restriction.

19. The computing apparatus of claim 11 wherein the data access system includes a planner and wherein the planner is configured to query the metadata service for the metadata defining the policies for deploying the data.

20. One or more non-transitory computer-readable storage media having program instructions stored thereon to operate a data access system for data processing environments comprising multiple application services and multiple storage services that, when read and executed by a processing system, direct the processing system to at least:
in a metadata service, receive a data query from an application service of the multiple application services, wherein the data query comprises a request for data stored in at least one of the multiple storage services;
in the metadata service, identify metadata that defines policies for retrieving and deploying the data, wherein the policies defined in the metadata include at least one restriction associated with the data;
in the metadata service, generate a task for retrieving and deploying the data based on the policies defined in the metadata, wherein the task modifies the request to indicate the policies;
in the metadata service, transfer the task to a data access service;
in the data access service, in response to receiving the task from the metadata service, retrieve the data from the at least one of the multiple storage services based on the policies;
in the data access service, generate a data configuration comprising the retrieved data based on the policies and standardized parameters; and
in the data access service, deploy the data configuration to the application service.

* * * * *